3,585,148
QUATERNARY AMMONIUM DEMULSIFIERS
John J. Sackis, Chicago, Ill., assignor to Nalco Chemical Company, Chicago, Ill.
No Drawing. Filed Mar. 26, 1969, Ser. No. 810,812
Int. Cl. B01d 17/04
U.S. Cl. 252—344
6 Claims

ABSTRACT OF THE DISCLOSURE

A method of demulsifying a dispersed oil in a non-oily continuous phase which comprises treating the emulsion with an effective amount of at least 10 p.p.m. (preferred 100–1000 p.p.m.) of a water soluble cationic copolymer having a M.W. of at least 2,000 and obtained by copolymerization of acrylamide and a bis-ethylenically unsaturated compound represented by

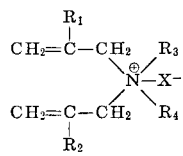

$R_1$ and $R_2$ each represent a member of a group consisting of hydrogen and methyl.
$R_3$ and $R_4$ each represent a member of a group consisting of loweralkyl, hydroxy loweralkyl, and $-(AlkO)_nH$ where $n=2-5$ and Alk=a member of a group selected from ethylene, propylene, and butylene.
$X^-$ represents a water soluble anion.

THE INVENTION

The instant invention relates to a method of resolving or separating emulsions of the oil-in-water type by chemical treatment. More specifically, the present invention is concerned with demulsifying oil-in-water emulsions by treating them with minor dosages of water-soluble cationic copolymers containing a quaternary moiety.

Oil-in-water emulsions are the type of emulsions which comprise organic oily materials which are distributed or dispersed as small drops throughout a continuous body of non-oily media. The organic oily materials which are immiscible with water or aqueous or non-oily media, in many instances form stable, difficulty separable emulsions. Often the amount of dispersed oily phase is minor in comparison to the aqueous or non-oily continuous phase, and is resistant to resolution.

An example of an economically important type of emulsion is one in which small proportions of petroleum or petroleum fractions are stably dispersed in water and/or brine non-oily continuous phases. It is essential to resolve this emulsion in order to recover the oily material substantially free of undesirable aqueous phase. Not only are emulsions found in areas of petroleum refining, but are also encountered in metal working industries, steel and aluminum rolling mills, chemical processing, food processing, and the like. Specifically, emulsions of oily matter in water or other non-oily environment are encountered in milk and mayonnaise processing, marine ballast water disposal, and furniture polish formulations. Often steam distillation and other techniques cause the above emulsions from which the valuable oil must be resolved and recovered.

It has been found that many oil-in-water emulsions can only be effectively broken with clean resolution of discontinuous and continuous phases, by treatment with large molecules such as long chain polymeric materials, and the present invention utilizes a novel class of water-soluble cationic polymeric materials derived from acrylamide and a quaternary compound of diallylamine.

A specific object of the invention is to provide a process of emulsion breaking by use of water-soluble high molecular weight copolymeric substances which have a wide range of applicability and are particularly effective in resolving oil-in-water emulsions of petroleum systems.

In accordance with the invention a successful method has been discovered for breaking emulsions of the type comprising an oil phase dispersed in a non-oily continuous phase such as water or such hydrophilic liquids as water-miscible alcohols, mixtures of same with water, etc. In this process it has been found that excellent separation of the oil and non-oil phases may be effected by treatment of the emulsion with at least a demulsifying amount of a copolymeric polyacrylamide demulsifier which has a plurality of a wide variety of strongly basic quaternary cationic groupings. After such chemical treatment of the emulsion, the respective phases may be rapidly resolved into distinct layers which are then separated by any number of well-known mechanical means such as merely drawing the heavier non-oily layer away from the lighter oil fraction through gravity separation means.

PRIOR ART

The prior art picture into which the present invention fits is represented by U.S. 3,316,181—Sackis. This patent teaches the use of acrylamide-diallylamine copolymers for breaking emulsions of the oil-in-water type. In contrast, the present invention amends or changes the diallylamine component by utilizing the strongly basic quaternaries, such as diallyl dimethylamine chloride and diallyl dihydroxyethylamine chloride, which sharply change the character of the functional groups of the copolymer. Particularly in the key operating concentrations of 100–1000 p.p.m., selected members of the present quaternaries have shown substantial improvement in demulsifying capacity when utilized against petroleum and metal rolling emulsions.

The copolymers of this invention have present utility as demulsifying agents.

A formula embracing the compounds of this invention is as follows:

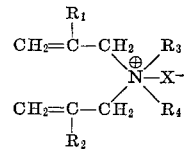

$R_1$ and $R_2$ each represent a member of a group consisting of hydrogen and methyl.
$R_3$ and $R_4$ each represent a member of a group consisting of loweralkyl, hydroxy loweralkyl, and $-(AlkO)_nH$ where $n=2-5$ and Alk=a member of a group selected from ethylene, propylene, and butylene.
$X^-$ represents a water soluble anion.

THE REACTANTS

(A) The quaternary ammonium component

The present invention utilizes as a monomer a diallylamine compound which has been quaternized to increase the positive charge on the resulting copolymers. With reference to the formula above, $R_3$ and $R_4$, the non-diallyl pendant groups on nitrogen, are selected from loweralkyl, hydroxy loweralkyl, and alkylene oxide adducts from ethylene oxide, propylene oxide and butylene oxide, where the introduction of the alkylene oxy group is controlled to a chain length of about 2–5.

The first mol of alkylene oxide, e.g., ethylene oxide, introduced produces a hydroxy compound, and subsequent molar units interpose in the chain to provide ether-alcohol type groups. Also, if the two non-allyl linkages are substituted the first two mols of ethylene oxide produce a glycol quaternary.

Preferred monomer reactants include the dimethyl and diethyl substituted alkyls, such as diallyl dimethyl ammonium chloride; the hydroxy substituted, such as diallyl dihydroxyethyl ammonium chloride; and the ethylene oxide condensates, when 2–5 mols of ethylene oxide are introduced into the chain. It is believed that in this oxyalkylation reaction, the oxyalkylene (AlkO) residue, or multiples thereof from 2–5 mols, are introduced into the initially formed hydroxy compound between the reactive or labile hydrogen atom and the adjoining oxygen. Thus a chain of oxyalkylene residues builds up in the diallyl component, including from about 2–5 recurrences of the bivalent alkylene oxide radical, —AlkO—.

The length of the alkylene oxide chain introduced as with ethylene oxide is usually governed and disciplined by the concentration of the reactant gas and other reaction conditions.

The quaternary ammonium compound is usually utilized in the form of a soluble salt wherein the anion ($X^-$) is conventionally halide, sulfate, nitrate, etc., with the particular selection made on the basis of cost and availability of common mineral acid anions.

(B) The acrylamide component

This monomer reactant includes acrylamide per se and, referring to the formula above, also to slight variations wherein $R_1$ and $R_2$ may be methyl as well as hydrogen.

POLYMERIZATION

The reaction is carried out generally according to the procedure of U.S. 3,316,181—Sackis, columns 3–5 inclusive, but substituting a quaternary ammonium compound for the diallylamine of the Sackis 3,316,181 patent.

Although the parts by weight of the quaternary may range from about 1–99 parts in the copolymer to about 99–1 parts acrylamide, nevertheless, an optimum range favoring emulsion breaking is from about 5–25 parts by weight of quaternary with the balance acrylamide, and these monomer reactant ratios are favored.

The instant polymerization reaction is exothermic at embient temperature and proceeds quite rapidly. An indication of when the polymerization is complete is when heat ceases to be evolved. As catalyst, a conventional redox may be utilized and a ternary system of 50–100 p.p.m. ferrous ion as (FAS) ferrous ammonium sulfate, 100 p.p.m. sodium meta-bisulfite, and 100 p.p.m. (AP) ammonium persulfate, which adds a metal activator to the basic initiator and reducing agent of the redox, is preferred.

A preferred reaction route is by solution polymerization, although other techniques such as emulsion or suspension may be utilized. Such a typical procedure is as follows:

To 100 parts of diallyl ammonium quaternary salt in aqueous solution about 300 parts of acrylamide monomer were added, and a temperature rise of 50–100° F. over ambient temperature due to the exothermic nature of the reaction was observed. When heat ceased to be evolved, the copolymer was deemed formed and the w.s. product was diluted to 10% with Chicago tap water to adjust to a suitable concentration for later utilizaion as an emulsifier.

A redox caalyst consisting of 50 p.p.m. ferrous ammonium sulfate, 100 p.p.m. sodium metabisulfite, 100 p.p.m. ammonium persulfate was utilized in the above reaction. In other examples, the range of catalysts was from 0.001% to about 7.0% and a preferred range was 0.01 to 2.0% based upon the total rate of reaction mixture.

UTILIZATION OF COPOLYMER AS DEMULSIFIER (A) pH, M.W. and dosage

It has been noted that emulsion resolution of the respective phases may be carried out more efficiently, rapidly, and with resultant increased clarity of the respective phases by lowering the pH of the oil in non-oily base below a pH of about 8.0 prior to treatment with the emulsifier. Of course, in many instances, the pH range may be already below that enumerated above. In this embodiment, the pH may even be lowered to about 1.0. However, for best results, the pH of the emulsion ranges between 2 and 8 prior to the demulsification step.

The copolymeric chemical demulsifiers of the invention are water-soluble copolymers of acrylamide in combination with some other polymerizable addition comonomer. The respective monomers are intimately mixed with one another and copolymerized by known methods such as bulk, solution, emulsion, suspension, etc., polymerization techniques. Preferably, the final active copolymer will contain from 1 to 99 parts of polyacrylamide, while the quaternary constituent will likewise comprise 1–99 parts of the overall copolymer. Preferred copolymers contain about 5–25 parts of the quaternary. In each case, the final copolymeric materials are viscous water-soluble samples of a relatively high molecular weight, at least above about 2,000 and preferably above about 10,000. It has been noted that the residence time or settling time is generally in inverse proportion to the chain length or the degree of molecular weight. Thus, the higher molecular weight samples are generally preferred.

The primary formed copolymeric product may be added to the emulsion in a wide range of dosage treatment. Normally, at least 10 p.p.m. of copolymer based on the weight of the emulsion is necessary. For more efficient results 250–1000 p.p.m. is preferred, and dosages ranging between 10 p.p.m. and 10,000 p.p.m. may be employed in the demulsification step.

(B) Comparison with the acrylamide-diallylamine demulsifier of 3,316,181—Sackis

In a series of studies, a 5% non-ionic rolling oil formulation in 95% Chicago tap water was utilized as the test oil-in-water emulsion to be broken. This was challenged with the basic acrylamide/diallylamine 75/25 and compared with representative species of the present invention, e.g., acrylamide/diallyl dimethyl ammonium chloride and
acrylamide/diallyl dihydroxyethyl ammonium chloride.

The results indicated that in the prime commercial concentration range of 250–1000 p.p.m., the representative quaternary formulations of the present invention were superior in demulsifying capability to the diallylamine copolymer of the prior U.S. 3,316,181—Sackis.

The data from this and other sources indicated that the most effective range for the diallyl component as a demulsifier was from about 5 to 25 parts based upon 100 for the copolymer. This data showing the diallyl quaternary component at 2, 40, 50 and 60 parts of the total weight by standard optical phototester comparison demonstrated uniformly less demulsifying activity than diallyl quaternary components within the preferred range.

Additionally, the data showed that when the non-allyl substituents on the nitrogen were alcohol or ether-alcoholic moieties resulting from the addition of about 1–5 (AlkO) groups, a demulsifier was obtained which in medium concentrations was superior to those where analogous addition was made with the lower alkyl ($C_1$–$C_6$) quaternary. Although other permutations are possible, the designation (AlkO) is designed to embrace specially ethyleneoxy-, propyleneoxy-, and butyleneoxy-multiples engendered by the reaction of a diallylamine compound with ethylene oxide, propylene oxide, and butylene oxide. The products from such reactions were mixed and gave fractional molar products, e.g., 2.9. A preferred reactant is ethylene oxide,

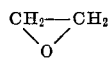

Where approximately one mol is added per linkage to N, an alcohol quaternary type product is obtained, e.g., a glycol type, diallyl dihydroxyethyl ammonium chloride. This product is most preferred and gave superior results when compared with the analogous dialkyl quaternary, e.g., dialkyl dimethyl ammonium chloride as well as dialkylamine in comparable minority quantites copolymerized with a major amount of acrylamide.

Other studies with creosote emulsions, etc., have shown the oxyalkylation of the diallylamine component up to a point where about a total of five-AlkO-multiples have been introduced in the chain of each affected nitrogen substituent. This produces an ether-alcohol dual functionality without substantial loss of demulsifier activity as compared with the most preferred hydroxy loweralkyl compositions, where the composition contains at least one hydroxy alkyl functionality per dialkyl ammonium quaternary. Where the —AlkO— goes beyond 5 per substituent to N, problems of solubility ensue which destroy the value of the copolymer as a water-soluble (w.s.) demulsifier.

EXAMPLE 1

Solution copolymerization of acrylamide with diallyl dimethyl ammonium chloride

A solution of 53.3 g. (20%) of diallyl dimethyl ammonium chloride in 213 g. of deionized (DI) water was prepared. The pH was adjusted to 6.9 and placed in a suitable reactor.

To this solution was added 2.66 g. (1%) of azo bis isobutyronitrile (Vazo) and the system was purged with nitrogen.

A solution of 213 g. (20%) of acrylamide in 852 g. 20.0% DI water was prepared and the pH was adjusted to 6.9 Twenty percent of this solution was pumped into the reactor. Purging with nitrogen was halted, the reactor contents were stirred at half speed and the temperature was raised to 55°–57° C.

When the copolymerization began, which was noted by a sudden increase in temperature, the temperature line was controlled and held at 57–60° C.

When the initial reaction moderated, the rest of the acrylamide solution was pumped into the reactor during 1¾–2 hours and stirred for an additional 2 hours at 60° C.

To the viscous reaction mixture was added 1330 g. of water to drop the concentration of copolymer to about 10%.

The ratio of acrylamide to diallyl dimethyl ammonium chloride was 80:20.

EXAMPLE 2

Solution copolymerization of acrylamide with diallyl di($\beta$ hydroxy ethyl) ammonium chloride A solution of 71 g. (20%) of diallyl di($\beta$ hydroxy ethyl) ammonium chloride was prepared in 284 g. of deionized water. The pH of this solution was adjusted to 6.9 and the mixture was transferred to a suitable reactor.

To the reactor was added 2.84 g. azo bis isobutyronitrile (1% of Vazo polymerization catalyst) and the reaction was purged with nitrogen.

A twenty percent solution of 213 g. of acrylamide in 852 g. DI water was added to the reactor. With moderate stirring, the reactor was heated to 55–57° before the reaction started.

The remainder of the acrylamide was pumped into the reactor during 1¾–2 hours at 57–60° and then held at 60° C. for 2 hours.

To this mixture was added 1420 g. of DI water to bring the final concentration of copolymer to about 10%.

The ratio of acrylamide to diallyl di($\beta$ hydroxy ethyl) ammonium chloride was 75:25.

EXAMPLE 3

Production of ethylene oxide (EO) quaternary copolymer 30 g. acrylamide, 20 g. of a 50% solution of a diallylamine ethylene oxide reaction product analyzing 2.9 mols EO per mol diallylamine and 150 g. distilled water were intimately mixed in a reactor.

1.2 ml. of a 1% FAS solution was added, followed by 25 ml. of sodium metabisulfite. Then, immediately, 25 ml. of ammonium persulfate was added at ambient temperature. The polymerization occurred almost instantly and an exotherm of about 40–60° F. was noted over a period of 10–15 minutes. On completion of the reaction, the resultant water-soluble polymer was diluted to appropriate solution.

Additional runs were made wherein the EO quaternary monomer reactant had been previously analyzed to show 5.6, 7.8, 12, and 20 mols per mol of diallylamine. It was noted that 2 ethylene oxide pendant links to the nitrogen were involved and that in the runs wherein the —EO— multiple was greater than 5 per linkage that polymer precipitation became troublesome.

DEFINITION

Where utilized in the present specification and claims, the meaning of the phrase below where used is governed by the following lexicon:

Non-oily continuous phase.—The aqueous continuous phase in an O/W emulsion and includes water and such hydrophilic liquids as water-miscible alcohols and mixtures thereof with water.

The embodiments of the invention in which an exclusive property or privilege is claimed are defined as follows:

1. A method breaking emulsions of the type comprising an oil phase dispersed in a non-oily continuous phase which comprises the step of treating the emulsion with at least a demulsifying amount of a strongly cationic copolymer having a molecular weight of at least 2000 and obtained by copolymerization of acrylamide and a quaternized bis-ethylenically unsaturated compound represented by the following structural formula:

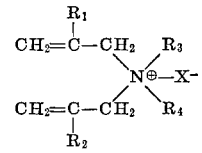

$R_1$ and $R_2$ each represent a member of a group selected from —H and —$CH_3$.

$R_3$ and $R_4$ each represent a member of a group selected from loweralkyl, hydroxy loweralkyl, and —(AlkO)$_n$H where n=2–5 and Alk=a member of a group selected from ethylene, propylene, and butylene.

$X^-$ represents a water soluble anion.

2. The method of claim 1 wherein the pH of said emulsion is adjusted below about 8.0 prior to treatment with said demulsifier.

3. The method of claim 1 wherein said demulsifier is added to said emulsion in a dosage of at least 10 p.p.m.

4. A method of breaking emulsions of the type comprising an oil phase dispersed in a non-oily continuous phase which comprises the steps of treating the emulsion with at least a demulsifying amount of a water-soluble cationic copolymer having a molecular weight of at least 2000 and obtained by copolymerization of acrylamide and a quaternary moiety selected from diallyl dimethyl ammonium and diallyl dihydroxyethyl ammonium combined with a water soluble anion.

5. The method of claim 4 wherein said copolymer comprises 95–75 parts of acrylamide and 5–25 parts of the quaternary diallyl dimethyl ammonium combined with a water soluble anion.

6. The method of claim 4 wherein said copolymer comprises 95–75 parts of acrylamide and 5–25 parts fo the quaternary diallyl dihydroxyethyl ammonium combined with a water soluble anion.

References Cited
UNITED STATES PATENTS
3,316,181  3/1967  Sakis _____ 252—344

JOHN D. WELSH, Primary Examiner

U.S. Cl. X.R.
252—341